United States Patent [19]

LeBlanc et al.

[11] 4,220,044

[45] Sep. 2, 1980

[54] WAVE MEASURING BUOY

[75] Inventors: Lester R. LeBlanc, Narragansett; Foster H. Middleton, Peace Dale, both of R.I.

[73] Assignee: Environmental Devices Corporation, Marion, Mass.

[21] Appl. No.: 35,345

[22] Filed: May 2, 1979

[51] Int. Cl.³ ............................................. G01W 1/00
[52] U.S. Cl. .................................................. 73/170 A
[58] Field of Search ..................................... 73/170 A

[56] References Cited

U.S. PATENT DOCUMENTS

| | | | |
|---|---|---|---|
| 3,301,048 | 1/1967 | Felsenthal, Jr. et al. | 73/170 A |
| 3,769,838 | 11/1973 | Buckler | 73/170 A |
| 4,135,394 | 1/1979 | Middleton et al. | 73/170 A |
| 4,158,306 | 6/1979 | Brainard | 73/170 A |

*Primary Examiner*—Donald O. Woodiel

[57] ABSTRACT

A wave measuring buoy for measuring ocean surface wave amplitude, frequency and direction of propagation is disclosed. The buoy includes a single-axis accelerometer suspended as a pendulum inside a water-proof housing. The water-proof housing is connected to and beneath the flotation hull of the buoy and is located at the center of rotation of the buoy assembly so that the accelerometer is substantially insensitive to roll and pitch motions of the buoy. An inclinometer and a compass are fixedly mounted inside of said flotation hull. Inasmuch as the inclinometer is fixed in the water-proof housing it responds to the pitch and roll motions of the buoy and the compass indicates the direction of said roll and pitch. The output of the accelerometer is an analog signal proportional to the vertical (heave) acceleration of the buoy. The outputs of the inclinometer and the compass are analog signals which indicate the pitch and roll of the buoy and the magnetic heading of said pitch and roll. The analog signal of the accelerometer is correlated with the pitch and roll signal of the inclinometer and the bearing signal of the compass to indicate the direction of the wave propagation. A frequency transfer calibration can be applied to the accelerometer output to compensate for the mass, size and resonant heave behavior of the buoy.

7 Claims, 6 Drawing Figures

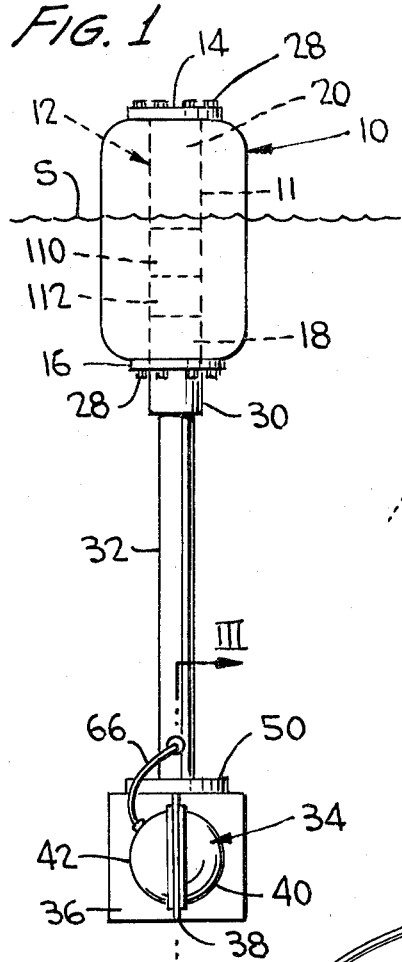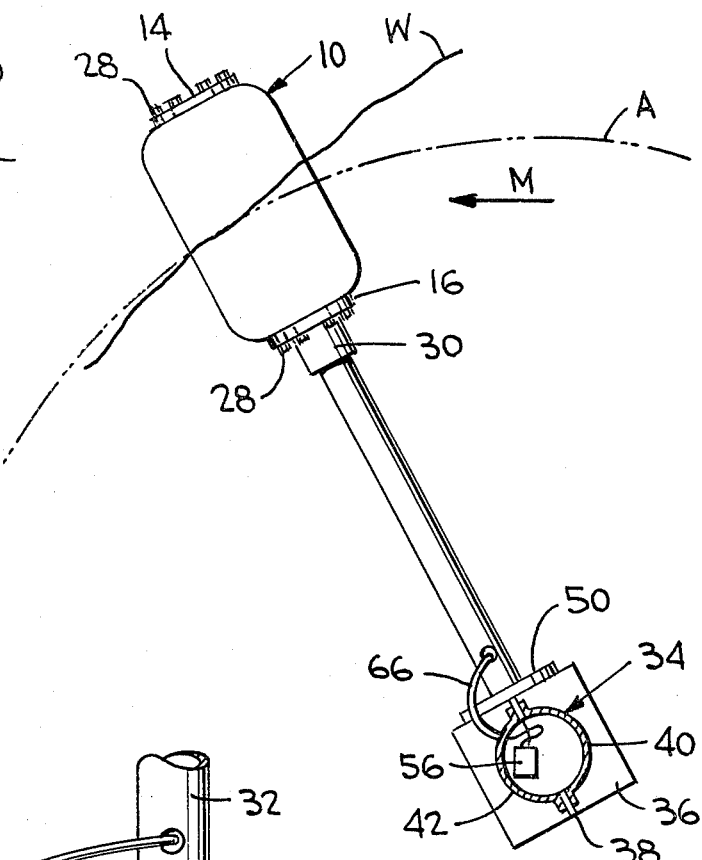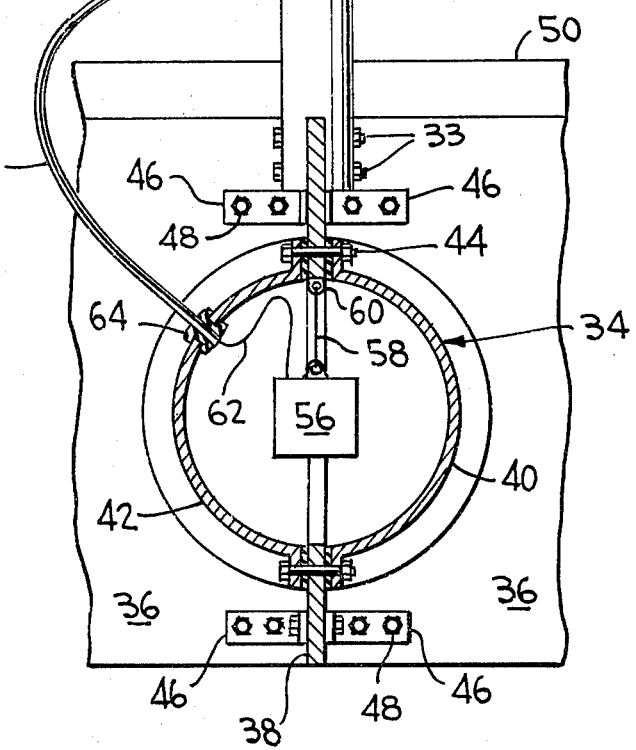

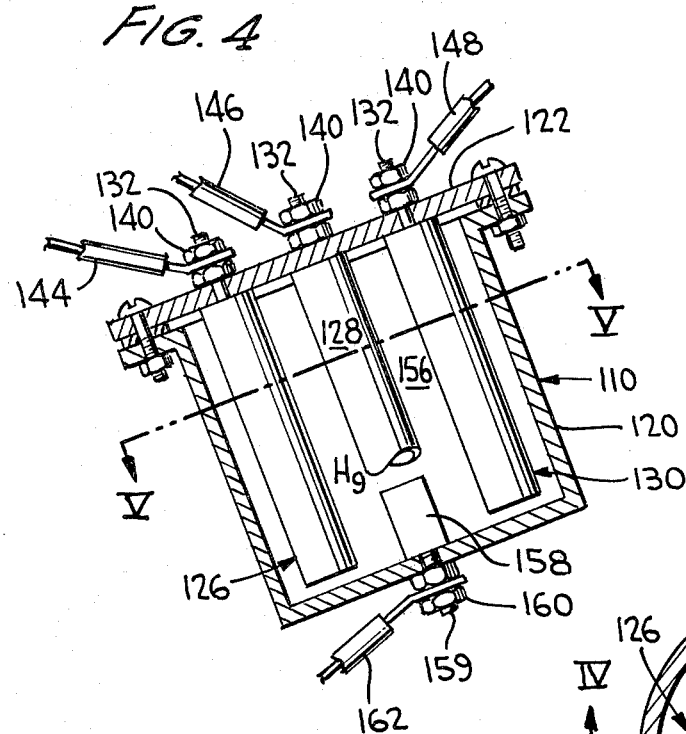
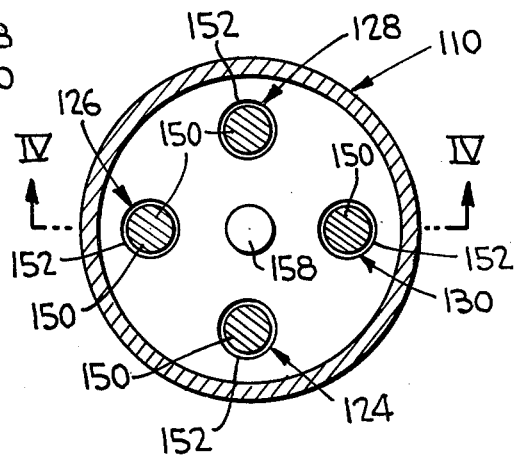
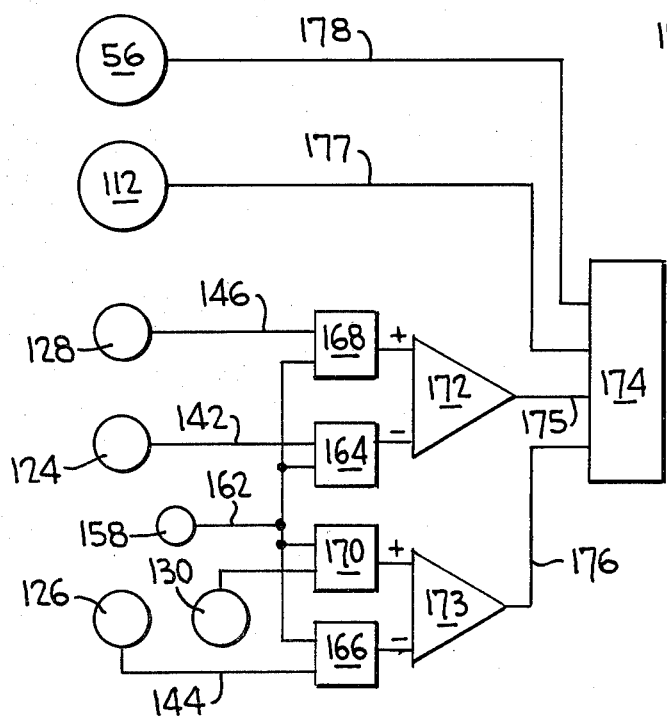

WAVE MEASURING BUOY

BACKGROUND OF THE INVENTION

In many marine operations and studies it is necessary to have accurate data relative to wave height, frequency and direction of wave propagation.

In many important ocean operations, either on the open sea or near shore, the direction of propagation of waves is often of extreme importance. Consider, for example, storm waves striking a beach, a harbor channel, a break-water, or any sort of offshore structure. Prior to the present invention wave incidence direction data was obtained visually or by deploying complex, complicated, and expensive spatially distributed arrays of wave measurement devices. One such method uses a plurality of wave staffs on a structure wherein the wave staffs must be separated by distances in the order of the wave length of interest which is clearly a cumbersome and inflexible arrangement.

SUMMARY OF THE INVENTION

Our U.S. Pat. No. 4,135,394, issued Jan. 23, 1979, for "Wave Measuring Buoy" discloses a buoy adapted to provide data relative to wave height and frequency. The present invention is an improvement on the disclosure of said U.S. Pat. No. 4,135,394 and combines with the disclosed structure an inclinometer and a compass which provide signals of slope and heading which signals are correlated with the analog signal of the accelerometer to indicate the direction in which the wave is traveling.

OBJECTS OF THE INVENTION

It is an object of the invention to provide a buoy capable of generating signals in response to its movement in following a wave passing thereunder which will indicate the direction in which such wave is traveling.

Another object of the invention is to provide a wave direction indicating buoy wherein a two axis inclinometer, a compass and an accelerometer indicate the direction in which a wave passing under said buoy is traveling.

Another object of the invention is to provide a buoy which acting alone provides information indicating the direction in which a wave passing thereunder is traveling.

Other objects will become apparent from the following specification and claims.

BRIEF DESCRIPTION OF THE DRAWINGS

FIG. 1 is a side elevation of the wave measuring buoy in calm water.

FIG. 2 is a view similar to FIG. 1 but showing the buoy reacting to a wave and also showing the water-proof accelerometer housing in section to show the vertical position of said accelerometer.

FIG. 3 is a fragmentary sectional view of the water-proof accelerometer housing taken on the line III—III of FIG. 1.

FIG. 4 is a sectional side elevation, with parts broken away, of the inclinometer taken on line IV—IV of FIG. 5.

FIG. 5 is a sectional plan view of the inclinometer taken on line V—V of FIG. 4.

FIG. 6 is a block diagram illustrating the manner in which the signals provided by the inclinometer, the compass and the accelerometer are processed to indicate the direction of wave travel.

DESCRIPTION OF THE PREFERRED EMBODIMENT

The wave measuring buoy assembly comprises a flotation hull 10 preferably formed of a durable plastic and filled with a solidified plastic foam. An axial opening 11 extends from the top of hull 10 to its bottom and which together with top plate 14 and bottom plate 16 forms a water-proof compartment 12 which contains a battery 18, and an electronic recorder or a telemetering unit 20. Also contained in compartment 12 is inclinometer 110 and compass 112 to be explained in detail hereinafter. Top and bottom plates 14 and 16 are secured to hull 10 by bolts 28 which engage threaded openings in hull 10, bottom plate 16 has a sleeve 30 secured to its lower surface. A length of pipe 32 fits within and is fixedly secured to sleeve 30.

A water-proof housing 34 and associated stabilizing fins 36 and 38 are fixed to the lower end of pipe 32. Water-proof housing 34 is formed from two flanged hemispheres 40 and 42 which are fastened together, with fin 38 therebetween, by bolts 44. The area of fin 38 inside said hemispheres is cut out to thereby provide a spherical cavity.

The lower end of pipe 32 is bifurcated and extends over the midpoint of fin 38 and is secured to said fin 38 by bolts 33. A pair of fins 36, each having a semi-circular opening in one edge are secured to fin 38, with their semi-circular opening adjacent water-proof housing 34, by means of brackets 46 and bolts 48. An annular weight 50 surrounds pipe 32 and rests on fins 36 and 38.

A single-axis accelerometer 56 is suspended in housing 34 by flexible strand 58 so as to be substantially in the center of said housing 34 when pipe 32 is vertical. Strand 58 can be any suitable material, such as fine nylon monofilament, which will permit accelerometer 56 to swing as a pendulum and to remain vertical as housing 34 pivots. The upper end of strand 58 is secured to an eye 60 formed on fin 38 and the lower end is secured to accelerometer 56. A flexible electrical lead 62 from accelerometer 56 passes through a water-proof seal 64 in hemisphere 42 and then through a protective sheath 66 into the lower end of pipe 32. Lead 62 extends upwardly in pipe 32 and passes through another water-proof seal (not shown) in bottom plate 16 and into water-proof compartment 12. Housing 34 is filled with a suitable damping fluid. The total weight of the wave measuring buoy is such that it floats on the surface of calm water in a vertical position with the surface of the water S at approximately the mid-point of hull 10.

Ideally, an accelerometer buoy is infinitesimally small, has no mass, and does not roll or pitch when riding on the wavey surface of the sea. Under such ideal conditions, a single-axis accelerometer detects the pure vertical acceleration of the buoy. For this ideal tiny "cork" situation, it is only necessary to double integrate the acceleration signal to produce the buoy displacement function. In this ideal massless case, there is no difference between the vertical displacement of the buoy and the vertical displacement of the wave surface. In the practical, real situation, the buoy must have finite size and it must have some mass. It will therefore have a resonant behavior of its own which depends upon the mass of the assembly, the size of the assembly, and the shape of the buoy body.

In the buoy assembly of the present invention there are two distinct pendulous motions. The first is the buoy assembly itself. The horizontal drag of fins 36, 38 and water-proof housing 34 is much higher than the horizontal drag of the flotation hull 10. As a result when the buoy assembly tends to either roll or pitch, it stabilizes itself by acting like an inverted pendulum wherein the center of roll or pitch rotation is water-proof housing 34 which contains accelerometer 56. FIG. 2 illustrates the manner in which flotation hull 10 swings on arc A around water-proof housing 34 as it reacts to approaching wave W which is traveling in the direction of arrow M. The buoy assembly is preferably so proportioned that its roll movement period is at least two seconds. The second pendulous motion is in the accelerometer suspension in the water-proof housing 34. This movement period preferably is no longer than 0.07 second.

The buoy assembly of the present invention can be drifting free on the surface of the water or it can be moored to the sea bottom by means of an anchor. When the buoy assembly is moored the mooring line should be attached to said buoy assembly at a location and in a manner which will have the least effect on the buoy assemblys tendency to pitch and roll.

It will be seen that as the buoy assembly reacts to wave motion the short period of the accelerometer pendulum will permit the accelerometer to quickly align itself with the vertical and therefore gain an insensitivity to roll and pitch. Thus the signal produced by accelerometer 56 will be due only to vertical acceleration.

A wave measuring buoy assembly having the following dimensions has movement periods as described above:

Flotation hull 10—diameter 18 inches, height 24 inches
Stabilizing fins 36—1 sq. ft. each—$\frac{1}{4}''$ plate
Stabilizing fin 38—2 sq. ft.—$\frac{1}{4}''$ plate
Inner diameter of housing 34—7 inches
Length of accelerometer pendulum—2 inches
Distance water-line to center of housing 34—6 feet
Weight 50—20 pounds
Pipe 32—$1\frac{1}{2}$ inch diameter iron pipe
Total weight of buoy assembly—about 85 pounds It will be clear from the above that the signal produced by accelerometer 56 will be produced only by the vertical movement of the wave buoy assembly. Double integration of that accelerometer signal will give the measurement of the buoy vertical displacement. In many instances such a figure is all that is required. This is especially so if the waves being measured are of considerable height and of a relatively long period. However, the buoy assembly has considerable mass and size and therefore does not follow the movement of a smaller wave as an infinitesimally small (no mass) buoy would. A correction or transfer function can be applied to the accelerometer signal to correct or calibrate that signal for the difference between the actual buoy assembly movement and the movement of a theoretical weightless accelerometer buoy. Such a transfer function is obtained by comparing the movement of the wave measuring buoy assembly with the actual displacement of the wave which caused such buoy movement. That wave displacement is determined by a wave measuring instrument fixed to a motionless structure. The transfer function thus obtained is a function which is applied to the accelerometer signal and the result is double integrated to give the true displacement of the wave.

The signal from the accelerometer can be handled in several different manners. For example, the accelerometer signal can be recorded on a tape recorder carried in the water-proof compartment 12. The recorded signals from the accelerometer thus obtained can be played into a computer which will apply the transfer function to the signals and double integrate the result to give the wave displacement. Alternatively telemetering equipment can be substituted in compartment 12 for the tape recorder. Such telemetering equipment to transmit the accelerometer signal to a shore, water or air based station. The signal thus transmitted can either be recorded and the recording played into a computer as above described or the transmitted signal can be fed directly to the computer.

It is believed that in the light of the above teaching the actual steps of computing the transfer function and of using that function to correct the accelerometer signal are within the skill of technicians working in the art. However, a detailed description of the manner in which such a transfer function can be determined and applied against an accelerometer signal is contained in paper number OTC 2597 entitled, "Spectral Tuning and Calibration of a Wave Follower Buoy" presently at the Eighth Annual Offshore Technology Conference, Houston, Tex., May 3-6, 1976.

Arrow M, FIG. 2, indicates the direction in which wave W is propagating. As said wave approaches the buoy assembly the buoy pivots about housing 34 on the front of said wave in the direction in which said wave is propagating. After the crest of the wave passes under the buoy assembly it pivots about said housing in the opposite direction which is opposite to the direction of wave movement. From this it will be clear that if one knows the bearing of the line along which the buoy assembly pivots as a wave approaches, passes thereunder and moves past there will be a 180° ambiguity as to the direction of the wave. However, if one knows the bearing of such line when the buoy is lifting there is no ambiguity because the front of a wave lifts the buoy and the front also tilts the buoy in the direction of wave propagation.

To provide information to be used with the output of accelerometer 56 to determine the direction of a wave approaching the buoy assembly a two axis inclinometer 110 and a magnetic compass 112 are mounted in water-proof compartment 12 in flotation hull 10.

Compass 112 comprises a magnetic compass in which the compass card drives a low-torque potentiometer which is calibrated to provide an output voltage which is an analog signal corresponding to the angle said compass card makes with the north pole of the compass, i.e., compass "lubbers line." Preferably compass 112 is one manufactured and sold by Humphrey, Inc., of San Diego, Calif., and sold under the trade name "North Seeker" Model Number NS04-0702-1, or a compass similar thereto. Compass 112 is mounted in water-proof compartment 12 by means of a suitable gimbal so that said compass card will remain horizontal as the buoy pitches and rolls on the surface of waves.

FIGS. 4 and 5 show a preferred embodiment of an inclinometer for use in the buoy of the present invention. Inclinometer 110 is a two axis inclinometer in which each axis is not responsive, to any substantial extent, to inclination at right angles to their normal response axes.

Inclinometer 110 comprises a cylindrical housing 120 and a cover 122 therefor. Four capacitors 124, 126, 128, and 130 are mounted on and depend from cover 122 by means of threaded extensions 132 thereon which extend upwardly through holes in cover 122 and are held in place thereon by nuts 140 which also attach leads 142, 144, 146, and 148, one to each said capacitor. Each of said four capacitors is a cylindrical stainless steel rod 150 completely covered by a suitable, preferably Teflon, thin uniform thickness dielectric 152. The bottom half of housing 120 is filled with mercury 154, and the upper half is filled with an insulating oil 156. A common terminal 158 is secured to the inside of the bottom of housing 120 by means of threaded extension 159 thereof which passes through a hole in the center of said bottom. Bottom terminal is held in place by nuts 160 which also attach common lead 162 to terminal 158. Terminal 158 is preferably made from stainless steel.

Inclinometer 110 is secured against movement in water-proof compartment 12 by any convenient means. Capacitors 124 and 128 comprise the X axis of inclinometer 110 and capacitors 126 and 130 comprise the Y axis thereof.

FIG. 4 illustrates inclinometer 110 tilted to correspond to the tilt of the buoy assembly as illustrated in FIG. 2. It will be seen that because of that tilt the mercury in which all four capacitors are immersed has moved up capacitor 126 and down capacitor 130 an equal amount. Thus the capacitance of capacitor 126 is increased and the capacitance of capacitor 130 is decreased by an equal amount. The lengths of capacitors 126 and 130 immersed in the mercury can be directly and separately measured by measuring the capacitance of each. However, since the capacitance of 126 increases by the same amount that 130 decreases as the tilt angle increases it is only necessary to measure the difference in the two capacitances, i.e., measure the differential capacitance.

A further advantage of determining the degree of tilt by measuring the differential capacitance is that inaccuracies caused by temperature variations, influence both capacitors the same amount and the difference is not changed.

The four capacitors 124, 126, 128, and 130 are calibrated so that the differential capacitance is an analog signal corresponding to the degree of tilt. It will be understood that inclinometer 110 functions in the same manner regardless of the direction of tilt. The only difference being the different values of the four capacitors 124, 126, 128 and 130 and the resulting different differential capacitances. It will also be understood that most of the time tilt of inclinometer 110 will involve all four capacitors. In those cases the differential capacitance values constitute a Cartesian form of displacement from the vertical. This is converted to a polar form, with the magnitude corresponding to the tilt angle and the polar angle giving the direction of tilt relative to an arbitrary reference direction, the horizontal center-line of the buoy to be explained hereinafter.

The buoy assembly is symetrical and substantially circular around its vertical axis. For the signals provided by inclinometer 110, compass 112 and accelerometer 56 to indicate the direction in which waves acting on the buoy are traveling it is necessary that the orientation of the north pole of said compass 112 and the orientation of said inclinometer 110 with respect to each other and the buoy itself be fixed. Therefore, one diameter of flotation hull 10 is arbitrarily picked as a horizontal center-line or axis. This diameter need not be marked on the buoy but it will hereinafter be referred to as the horizontal center-line of the buoy. As will be seen this horizontal center-line corresponds to the center-line of a conventional boat or ship.

Preferably compass 112 is mounted in flotation hull 10 in much the same manner as a compass is normally mounted in a boat or ship. The horizontal center-line of the buoy corresponds to the longitudinal axis of a boat and in either case the "lubber line" of the compass is installed in a position aligned with the centerline. For simplicity the inclinometer 110 is preferably fixed in hull 10 with its capacitors 124 and 128 aligned with the horizontal centerline of the buoy. In this manner the output from this capacitor pair may be called the "pitch" output and the output from the other pair may be called the "roll" output of the inclinometer.

Referring now to FIG. 6, the four capacitors 124, 126, 128 and 130 are connected to four capacitance voltage converters 164, 166, 168 and 170 respectively by means of capacitor leads 142, 144, 146 and 148. Common terminal 158 is connected to all four of the capacitance voltage converters by means of common lead 162. The outputs of capacitance voltage converters 164 and 168 are fed to differential amplifiers 172. The output of amplifier 172 is the differential voltage representing tilt of the inclinometer 110 in the direction of capacitors 124 and 128 axis. Similarly, the outputs of capacitance voltage converters 166 and 170 are fed to differential amplifier 173. The output of amplifier 173 is the differential voltage representing tilt of the inclinometer 110 in the direction of capacitors 126 and 130 axis. The two differential voltages produced by differential amplifiers 172 and 173 are fed to computer 174 through leads 175 and 176 respectively. The voltage corresponding to the compass bearing of the buoys horizontal center-line is fed from compass 112 to computer 174 by lead 177. The output signal from accelerometer 56 representing vertical movement of the buoy assembly is fed to computer 174 through lead 178.

The computer 174 processes the two signals from differential amplifiers 172 and 173 to produce a signal corresponding to the direction of tilt with respect to the buoy assembly horizontal center-line. The computer combines the voltage signal from compass 112 with the last mentioned signal generated from the output from the differential amplifiers 172 and 173 to thereby produce a signal corresponding to the compass bearing of the direction of tilt of the buoy assembly. The computer 174 is programmed to only compute said last mentioned compass bearing when it is receiving a signal from accelerometer 56 indicating that the buoy is being moved upwardly. Inasmuch as the buoy moves upwardly the output of the computer is a signal which corresponds to the compass bearing of the direction of wave travel.

The output of computer 174 is preferably converted from an analog to a digital signal which is displayed on a digital read-out, or is used to produce a print-out of wave direction.

Large waves or swells are the type waves that need to be monitored because of their great potential for damage. However, there usually are small waves or chop superimposed on and running in directions different from the large main wave. To prevent these small waves and chop from producing a multiplicity of relatively unimportant but confusing information differential amplifiers 172 and 173 each include a threshold, preferrably adjustable, for eliminating short term variations in tilt caused by such minor superimposed waves.

The signals produced by inclinometer 110, compass 112, and accelerometer 56 are preferrably transmitted from the buoy assembly to a remote location where they are processed to produce the wave height and direction data. These signals can be transmitted by a cable extending from the buoy to the processing location. Alternatively they can be transmitted to said location by the previously mentioned telemetering equipment.

It will be apparent to those skilled in the art that various changes and modifications may be made in the construction and arrangement of parts as illustrated and described without department from the spirit of the invention, and it is intended that all such changes and modifications shall be embraced within the scope of the following claims.

What is claimed is:

1. A wave measuring buoy assembly capable of being launched and retrieved from a small boat and which when launched tends to follow the wave surface and in the course of following a wave surface tends to pitch and roll, said assembly comprising a flotation hull and a rigid, underwater assembly depending therefrom, said underwater assembly having a greater horizontal drag than said hull, said underwater assembly comprising a water-proof housing and means fixing said housing to said hull and spaced therebelow, said hull being adapted to support said underwater assembly therebeneath in a body of water, said housing being spaced below said flotation hull a distance such that as the buoy assembly rolls or pitches under the influence of wave motion it stabilizes itself by acting as an inverted pendulum, the center of rotation of which is said housing, whereby said inverted pendulum when on the front of a wave passing thereunder swings around said housing in the direction of propagation of said wave and swings in the opposite direction as the crest of the wave passes thereunder to position it on the back side of said wave, said buoy assembly having a horizontal center-line, an accelerometer suspended in said housing for pivotal motion relative thereto, a two axis inclinometer having said two axes at substantially 90° to each other fixed to said buoy assembly and a compass having a north-south axis mounted on said buoy assembly, said inclinometer and said compass being so positioned with respect to each other and to said buoy assembly that one inclinometer axis makes a predetermined angle with said horizontal center-line and the north-south axis of said compass also makes a predetermined angle with said horizontal center-line, each axis of said inclinometer being adapted to produce an output signal related to tilt of said buoy assembly, said compass being adapted to produce an output signal related to the compass bearing of said horizontal center-line and said accelerometer being adapted to produce an output signal when said buoy assembly is lifted by the front of a wave, and means to process the output signals from said inclinometer, said compass and said accelerometer to indicate the direction of a wave passing under said buoy assembly.

2. A wave measuring buoy as set forth in claim 1 wherein said compass is mounted on said buoy assembly by means of a gimbal and said accelerometer is suspended as a pendulum.

3. A wave measuring buoy as set forth in claim 2 wherein said inclinometer and said compass are both mounted within said flotation hull.

4. A wave measuring buoy as set forth in claim 3 wherein said housing contains a damping fluid.

5. A wave measuring buoy as set forth in claim 4 wherein said underwater assembly includes a stabilizing fin.

6. A wave measuring buoy as set forth in claim 1 wherein said inclinometer comprises a first pair of spaced apart conductive rods mounted in a housing with their axes substantially parallel to the vertical axis of said buoy assembly, a second pair of conductive rods spaced apart and mounted in said housing on a line substantially 90° to the line between said first pair of rods and with their axes substantially parallel to the vertical axis of said buoy assembly, a uniform layer of dielectric material covering each of said rods, and a conducting fluid in said housing immersing all of the rods comprising said first and said second pair to a uniform depth, whereby each of said immersed rods comprises a variable capacitor and the difference in capacitance between said first pair represents tilt of said inclinometer and buoy on a first axis, and the difference in capacitance of said second pair represents tilt of said inclinometer and buoy on a second axis.

7. A wave measuring buoy as set forth in claim 6 wherein said inclinometer housing also contains an insulating fluid to damp motion of said conducting fluid.

* * * * *